(12) United States Patent
Sakata

(10) Patent No.: US 9,376,135 B2
(45) Date of Patent: Jun. 28, 2016

(54) STEERING DEVICE

(71) Applicants: JTEKT CORPORATION, Osaka-shi, Osaka (JP); FUJI KIKO CO., LTD, Kosai-shi, Shizuoka (JP)

(72) Inventor: Toru Sakata, Katsuragi (JP)

(73) Assignees: JTEKT CORPORATION, Osaka-shi (JP); FUJI KIKO CO., LTD., Kosai-shi (JP)

( * ) Notice: Subject to any disclaimer, the term of this patent is extended or adjusted under 35 U.S.C. 154(b) by 0 days.

(21) Appl. No.: 14/612,803

(22) Filed: Feb. 3, 2015

(65) Prior Publication Data
US 2015/0225009 A1 Aug. 13, 2015

(30) Foreign Application Priority Data
Feb. 7, 2014 (JP) ................ 2014-022531

(51) Int. Cl.
- *B62D 1/184* (2006.01)
- *B62D 1/185* (2006.01)
- *B62D 1/187* (2006.01)

(52) U.S. Cl.
CPC ............... *B62D 1/184* (2013.01); *B62D 1/185* (2013.01); *B62D 1/187* (2013.01)

(58) Field of Classification Search
CPC ......... B62D 1/184; B62D 1/185; B62D 1/187
See application file for complete search history.

(56) References Cited

U.S. PATENT DOCUMENTS

| | | | | |
|---|---|---|---|---|
| 5,743,150 A * | 4/1998 | Fevre | ................. | B62D 1/184 280/775 |
| 5,893,676 A | 4/1999 | Yamamoto et al. | | |
| 6,419,269 B1 * | 7/2002 | Manwaring | ............ | B62D 1/195 280/775 |
| 6,792,824 B2 * | 9/2004 | Jolley | .................... | B62D 1/184 280/775 |
| 7,677,133 B2 * | 3/2010 | Matsui | .................... | B62D 1/184 280/775 |
| 9,073,573 B2 * | 7/2015 | Sugiura | .................... | B62D 1/18 |
| 9,187,115 B2 * | 11/2015 | Kakishita | ............... | B62D 1/184 |
| 2004/0041387 A1 | 3/2004 | Lutz | | |
| 2004/0261565 A1 * | 12/2004 | Uphaus | .................. | B62D 1/184 74/493 |
| 2008/0053264 A1 * | 3/2008 | Matsui | .................. | B62D 1/184 74/493 |
| 2010/0275721 A1 * | 11/2010 | Davies | .................. | B62D 1/184 74/493 |
| 2010/0300236 A1 * | 12/2010 | Goulay | ................. | B62D 1/195 74/493 |
| 2010/0301593 A1 * | 12/2010 | Sakata | .................. | B62D 1/184 280/775 |
| 2011/0210538 A1 * | 9/2011 | Warashina | ............ | B62D 1/184 280/775 |
| 2013/0174684 A1 * | 7/2013 | Burns | .................. | B62D 1/184 74/493 |

(Continued)

FOREIGN PATENT DOCUMENTS

| | | |
|---|---|---|
| EP | 1 394 012 A1 | 3/2004 |
| EP | 2 195 221 A1 | 6/2010 |

(Continued)

*Primary Examiner* — James English
(74) *Attorney, Agent, or Firm* — Oliff PLC

(57) ABSTRACT

A steering device includes a steering column capable of a telescopic adjustment, a support bracket provided with an insertion hole, a movable tooth member fitted into the insertion hole with play in an axial direction, and a stationary tooth member arranged so as to face the movable tooth member. The movable tooth member has a first tooth, and is elastically displaceable to both sides in the axial direction from a predetermined neutral position. The stationary tooth member with a second tooth engageable with the first tooth is moved in a lateral direction to be brought into contact with the movable tooth member and to be separated therefrom. As a result, the second tooth is allowed to engage with the first tooth, and engagement between the first tooth and the second tooth is released.

6 Claims, 10 Drawing Sheets

(56) References Cited

U.S. PATENT DOCUMENTS

| | | | | |
|---|---|---|---|---|
| 2014/0053677 A1* | 2/2014 | Sakata | ............... | B62D 1/195 74/493 |
| 2014/0182410 A1* | 7/2014 | Sakata | ............... | B62D 1/18 74/493 |
| 2014/0352479 A1* | 12/2014 | Hiesse | ............... | B62D 1/184 74/492 |
| 2015/0239490 A1* | 8/2015 | Sakata | ............... | B62D 1/195 74/493 |

FOREIGN PATENT DOCUMENTS

| | | |
|---|---|---|
| JP | H09254792 A | 9/1997 |
| JP | 2008-239085 A | 10/2008 |
| WO | 2009047516 A1 | 4/2009 |

\* cited by examiner

STEERING DEVICE

INCORPORATION REFERENCE

The disclosure of Japanese Patent Application No. 2014-022531 filed on Feb. 7, 2014 including the specification, drawings and abstract is incorporated herein by reference in its entirety.

BACKGROUND OF THE INVENTION

1. Field of the Invention

The present invention relates to a steering device.

2. Description of Related Art

As a steering device, a steering column device of Japanese Patent Application Publication No. 2008-239085 includes a fixing bracket provided with a tilt teeth portion in which tilt crest portions and tilt trough portions are continuously formed, and a movable member including a movable side portion provided with a tilt lock teeth portion in which tilt lock crest portions and tilt lock trough portions are continuously formed, as a structure for locking a steering member after a tilt adjustment. The tilt lock teeth portion is capable of fitting with the tilt teeth portion. The movable member is provided with a flexible member having crest portions that project higher than the tilt lock crest portions. When the movable member squeezes the fixing bracket in a state where the tilt crest portions of the tilt teeth portion and the crest portions of the flexible member are brought into contact with each other and are faced each other, the crest portions of the flexible member move toward the tilt trough portions while sliding on inclined surfaces of the tilt crest portions to prevent a half-lock state in which the tilt crest portions and the tilt lock crest portions are still in contact with each other.

In addition, in a tilt-type steering column device disclosed in Japanese Patent Application Publication No. 9-254792, ratchet teeth portions of two blocks capable of being close to or away from each other are engaged with each other to lock a steering member after tilt adjustment. In the tilt-type steering column device, when respective ratchet teeth portions of the two blocks are engaged with each other, an engaging guide member supported and fixed by one of the ratchet teeth portions is fitted to trough portions of the other of the ratchet teeth portions to prevent crest portions of the respective ratchet teeth portions from being brought into contact with each other so that a half-lock state between the ratchet teeth portion is prevented.

Adjustments other than the tilt adjustments described above include a telescopic adjustment of adjusting a steering member in an axial direction of a steering shaft. Hereinafter, it is assumed that a structure for preventing a half-lock state is applied to the telescopic adjustment in the inventions of JP 2008-239085A and JP 9-254792A. The structure for preventing the half-lock state in the invention of JP 2008-239085A is required to allow the flexible member to be brought into contact with the tilt crest portions before the tilt lock crest portions, so that the structure is complicated. The same applies to a tilt-type steering device of JP 9-254792A that prevents a half-lock state with a structure similar to that of the invention of JP 2008-239085A.

SUMMARY OF THE INVENTION

In the steering column device of JP 2008-239085A, there is only a function in which the flexible member guides the tilt lock crest portions to the closest tilt trough portions. Thus, in the structure, only a stepwise adjustment per distance between the tilt trough portions adjacent to each other (a tilt adjustment in the invention of JP 2008-239085A) is available. The same applies to the invention of JP 9-254792A. The present invention provides a steering device capable of steplessly performing telescopic adjustment with a structure capable of a telescopic adjustment in which half-lock can be prevented with a simple structure.

A first embodiment of the present invention includes: a steering shaft having one end connected to a steering member, the steering shaft being extendable in an axial direction; a steering column that has an upper column provided on a side of the steering member and a lower column provided on a side opposite to the side of the steering member, the steering column rotatably supporting the steering shaft with the upper column and the lower column and allowing for telescopic adjustment of the steering member by relative displacement of the upper column in the axial direction with respect to the lower column; a support bracket that is provided with an insertion hole elongated in the axial direction, the insertion hole extending in an orthogonal direction that is a lateral direction orthogonal to the axial direction, and the support bracket being fixed to the upper column; a movable tooth member that has a first tooth composed of a plurality of teeth aligned along the axial direction in a rack-shape, and that is inserted into the insertion hole with play in the axial direction to be elastically displaceable to both sides in the axial direction from a predetermined neutral position; a stationary tooth member that has a second tooth provided with teeth engageable with the first tooth, and that is arranged so as to face the movable tooth member in the orthogonal direction; and a lock and release mechanism that moves the stationary tooth member in the orthogonal direction to allow the stationary tooth member to be brought into contact with the movable tooth member or to be separated from the movable tooth member, thereby allowing the second tooth to engage with the first tooth to lock the upper column in the axial direction, or releasing engagement between the first tooth and the second tooth to release lock of the upper column.

According to the embodiment described above, the movable tooth member is inserted into the insertion hole formed in the support bracket provided on a side of the upper column that moves for the telescopic adjustment with the play in the axial direction of the steering shaft. The movable tooth member in the state above is elastically displaceable to both the ends in the axial direction from the predetermined neutral position. The movable tooth member has the first tooth composed of the plurality of teeth aligned along the axial direction in a rack-shape. The stationary tooth member arranged so as to face the movable tooth member in the orthogonal direction has the second tooth provided with the teeth engageable with the first tooth.

When the stationary tooth member is moved with the lock and release mechanism to come close to the movable tooth member in order to lock the upper column after the telescopic adjustment, there is a possibility that a tooth tip of the first tooth and a tooth tip of may be brought into contact with each other. In this case, the movable tooth member displaces in the axial direction to allow the tooth tip of the first tooth to be displaced with respect to the tooth tip of the second tooth, so that the first tooth and the second tooth can be engaged with each other without half-lock. Thus, for example, it is not required to separately provide a component that is brought into contact with the tooth tip of the second tooth before the tooth tip of the first tooth is brought into contact with the tooth tip of the second tooth to guide the first tooth to prevent the half-lock from occurring. As a result, it is possible to prevent the half-lock with a simple structure.

The movable tooth member can be displaced in the axial direction in the insertion hole of the support bracket, so that it is possible to perform a telescopic adjustment in a stepwise manner per distance between teeth adjacent to each other in the first tooth as well as a subtle telescopic adjustment in a range of the distance. That is, it is possible to steplessly perform the telescopic adjustment.

In the embodiment described above, elastic members may be provided at least on both sides of the movable tooth member in the axial direction in the insertion hole to elastically support the movable tooth member so that the movable tooth member is returned to the neutral position.

According to the configuration described above, the elastic members provided on the both sides of the movable tooth member in the axial direction in the insertion hole can elastically displace the movable tooth member in the axial direction, and return the movable tooth member to the predetermined neutral position when engagement between the first tooth and the second tooth is released.

In the embodiment described above, the movable tooth member may include an elongated hole that is provided at a position deviated from the first tooth to penetrate the movable tooth member in the orthogonal direction, and that is elongated in the axial direction, and the lock and release mechanism may include an insertion shaft that extends in the orthogonal direction to be inserted into the elongated hole and the insertion hole, and that is connected to the stationary tooth member to be able to be relatively moved in the axial direction with respect to the upper column. The support bracket may include a telescopic regulation part that is provided at a position separate from each of the elongated hole and the insertion hole, and that regulates the amount of relative movement of the insertion shaft in the axial direction in the telescopic adjustment within a predetermined range.

According to the configuration described above, at the time of the telescopic adjustment, the insertion shaft of the lock and release mechanism can be moved relatively in the axial direction with respect to the upper column while being inserted into the elongated hole of the movable tooth member and the insertion hole of the support bracket insertion. The amount of relative movement of the insertion shaft in the axial direction serves as the amount of the telescopic adjustment of the steering member. The support bracket includes the telescopic regulation part provided at a position separate from each of the elongated hole of the movable tooth member and the insertion hole of the support bracket. Since the telescopic regulation part is not displaced in the axial direction unlike the elongated hole that is displaced together with the movable tooth member inserted into the insertion hole, it is possible to reliably regulate the amount of the telescopic adjustment within the predetermined range.

The embodiment described above may include a rotation regulation part that regulates rotation of the stationary tooth member around the insertion shaft.

According to the configuration described above, rotation of the stationary tooth member around the insertion shaft is regulated by the rotation regulation part, so that the stationary tooth member can be moved in the orthogonal direction without rotating together with insertion shaft. Accordingly, the stationary tooth member can reliably allow the second tooth to engage with the first tooth, and reliably release engagement between the first tooth and the second tooth.

The embodiment described above may include a receiving part that receives pressing force instead of an engaged portion between the first tooth and the second tooth, the pressing force being applied from the stationary tooth member when the first tooth and the second tooth engage with each other.

According to the configuration described above, the receiving part instead of the engaged portion between the first tooth and the second tooth receives the pressing force from the stationary tooth member, so that it is possible to prevent breakage of the first tooth and the second tooth in the engaged portion.

In the embodiment described above, the receiving part may be provided separately from the movable tooth member.

According to the configuration described above, the receiving part is provided separately from the movable tooth member, so that the movable tooth member can be smoothly displaced in the axial direction to prevent the half-lock without being affected by the pressing force from the stationary tooth member.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
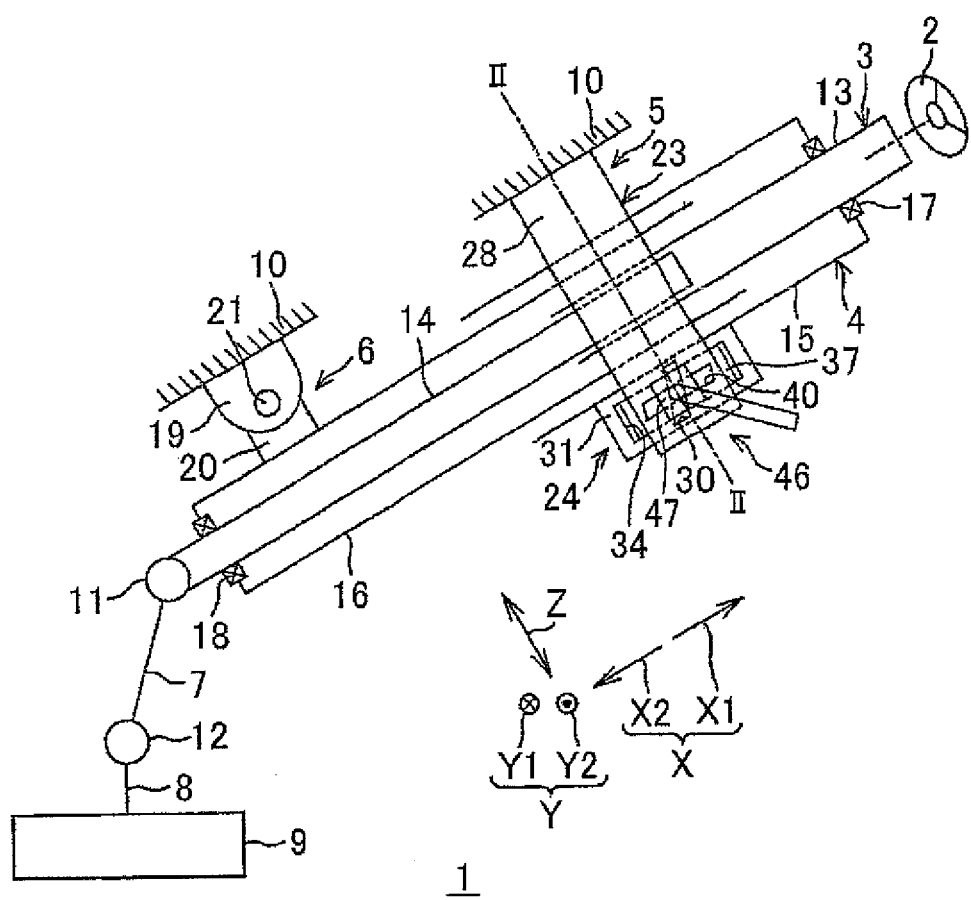
FIG. 1 is a side view of an outline of a steering device 1 of one embodiment of the present invention.
Figure 2:
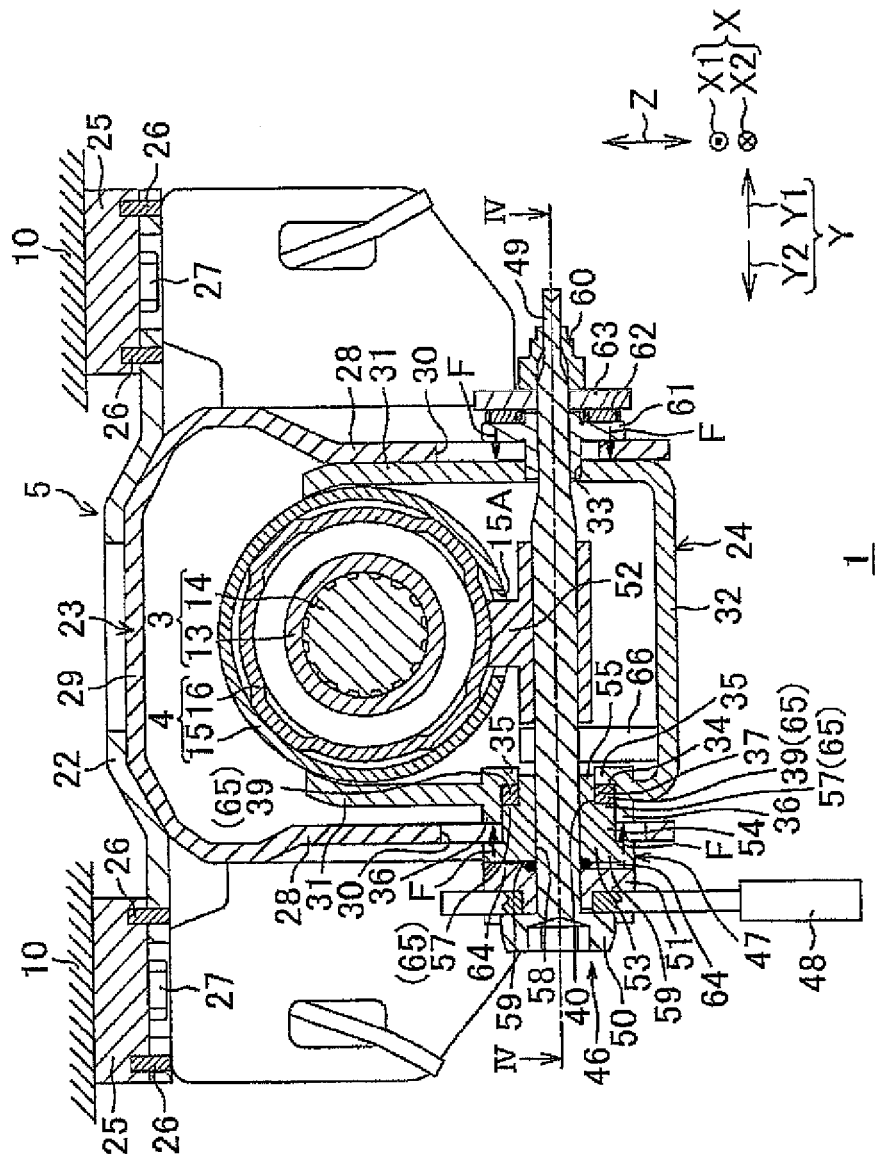
FIG. 2 is a cross-sectional view taken along the line II-II of FIG. 1.

Hereinafter, embodiments of the present invention will be described in detail with reference to the accompanying drawings. FIG. 1 is a side view of an outline of the steering device 1 of one embodiment of the present invention. FIG. 2 is a cross-sectional view taken along the line of FIG. 1. FIG. 1 shows as follows: a left side in a paper-surface is a front side of a vehicle body 10 in which the steering device 1 is to be mounted; a right side in the paper-surface is a rear side of the vehicle body 10; an upper side in the paper-surface is an upper side of the vehicle body 10; and a lower side in the paper-surface is a lower side of the vehicle body 10. FIG. 2 shows as follows: a back side of a paper-surface is the front side of the vehicle body 10; a proximal side in the paper-surface is the rear side of the vehicle body 10; a right side in the paper-surface is a right side of the vehicle body 10; and a left side in the paper-surface is a left side of the vehicle body 10.

With reference to FIG. 1, in the steering device 1, a steering shaft 3 having one end connected to a steering member 2 is coupled to a steering mechanism 9 through a universal joint 11, an intermediate shaft 7, universal joint 12, and a pinion shaft 8 in order. Thus, the steering shaft 3 is rotated around an axis thereof by steering torque transmitted from the steering member 2, and the rotation is transmitted to the steering mechanism 9.

The steering mechanism 9 is composed of a rack-and-pinion mechanism and the like. The steering mechanism 9 steers a steering wheel such as a tire (not shown) in response to transmission of the rotation of the steering shaft 3. The steering shaft 3 is substantially cylindrical shape. Hereinafter, a direction in which the steering shaft 3 extends (a direction extending from lower left toward upper right in the paper-surface of FIG. 1) is indicated as an axial direction X. The rear in the axial direction X is designated by a reference character "X1", and the front in the axial direction X is designated by a reference character "X2". In addition, in directions orthogonal to the axial direction X, a direction perpendicular to the paper-surface in FIG. 1 is indicated as a lateral direction Y (orthogonal direction), and a direction extending substantially up and down in FIG. 1 is indicated as a vertical direction Z. The right in the lateral direction Y is designated by a reference character "Y1", and the left in the lateral direction Y is designated by a reference character "Y2".

The steering shaft 3 includes an upper shaft 13 provided on a steering member 2 side (on the side in the rear X1), and a lower shaft 14 provided on, an opposite side (the on the side in the front X2) with respect to the steering member 2 side. The upper shaft 13 and the lower shaft 14 are coaxially aligned. The upper shaft 13 is provided with a substantially cylindrical end at least on the on the side in the front X2. The lower shaft 14 is inserted from a front lower side with respect to a front end of the upper shaft 13. The upper shaft 13 and the lower shaft 14 are fitted with each other by using spline fit or serration fit. Thus, the upper shaft 13 and the lower shaft 14 can be integrally rotated, and can be moved relatively along the axial direction X. Accordingly, the steering shaft 3 is extendable in the axial direction X.

The steering device 1 further includes a steering column 4, an upper bracket 5, and a lower bracket 6. In addition, other components described below also constitute the steering device 1. The steering column 4 a hollow body extending in the axial direction X as a whole. The steering shaft 3 is coaxially inserted into the steering column 4.

The steering column 4 includes an upper column 15 provided on the steering member 2 side (on the side in the rear X1), and a lower column 16 provided on the opposite side (the on the side in the front X2) with respect to the steering member 2. The upper column 15 and the lower column 16 are substantially cylindrical shape. The upper column 15 and the lower column 16 are coaxially aligned. The lower column 16 is inserted from a front lower side with respect to an end of the upper column 15 on the side in the front X2. In this state, the upper column 15 can be moved relatively to the lower column 16 in the axial direction X.

The upper shaft 13 is coupled to the upper column 15 through a bearing 17, and the lower shaft 14 is coupled to the lower column 16 through a bearing 18. The upper column 15 rotatably supports the upper shaft 13, and the lower column 16 rotatably supports the lower shaft 14. Thus, the steering column 4 rotatably supports the steering shaft 3 with the upper column 15 and the lower column 16. In addition, the upper column 15 and the lower column 16 can be moved relatively to the upper shaft 13 and the lower shaft 14 in the anal direction X, respectively. That is, the steering column 4 is extendable in the axial direction X together with the steering shaft 3. Extension here is called "telescopic".

The lower bracket 6 supports the steering column 4 (especially, the lower column 16) and couples the steering device 1 to the vehicle body 10. The lower bracket 6 includes a fixing bracket 19 fixed to the vehicle body 10, a movable bracket 20 fixed to the lower column 16, and a center shaft 21 extending in the lateral direction Y. The movable bracket 20 is rotatably supported by the fixing bracket 19 through the center shaft 21. Thus, the whole of the steering device can be rotated by centering the center shaft 21. Rotation here is called "tilt".

The upper bracket 5 supports the steering column 4 (especially, the upper column 15) and couples the steering device 1 to the vehicle body 10. With reference to FIG. 2, the upper bracket 5 includes a top plate 22, a fixing bracket 23, and a support bracket 24. The top plate 22 like a plate extends in the axial direction X and the lateral direction Y. The top plate 22 includes both ends in the lateral direction Y that are fixed to the vehicle body 10 through a pair of attachments 25.

Each of the attachments 25 and the top plate 22 are coupled to each other by pins 26 made of synthetic resin that can be broken and that penetrate the top plate 22 in the vertical direction Z, and each of the attachments 25 is fixed to the vehicle body 10 with a fixed bolt 27. The fixing bracket 23 has a groove shape opening downward (a substantially inversed U-shape viewed from the axial direction X), and is symmetrically formed across the steering column 4. Specifically, the fixing bracket 23 includes a pair of side plates 28 that faces each other across the steering column 4, and a coupling plate 29 that couples upper side ends of the pair of side plates 28. The coupling plate 29 is connected to the top plate 22. The pair of side plates 28 is provided with an elongated hole 30 for tilt at the same position viewed from the lateral direction Y. The elongated hole 30 for tilt extends along an arc centering the center shaft 21 in a substantially vertical direction Z (refer to FIG. 1).

The support bracket 24 has a groove shape opening upward (a substantially U-shape viewed from the axial direction X), and is generally symmetrically formed across the steering column 4. Specifically, the support bracket 24 includes a pair of side plates 31 that faces each other across the steering column 4, and a coupling plate 32 that couples lower side ends of the pair of side plates 31. Upper side ends of the pair of side plates 31 are connected to an outer peripheral surface of the upper column 15 by welding and the like. Accordingly, the support bracket 24 is fixed to the upper column 15.

The side plate 31 on the right side is provided with an elongated hole 33 for telescopic extending in the axial direction X. The side plate 31 on the left side is provided with an insertion hole 34 elongated in the axial direction X at a position overlapping with the elongated hole 33 for telescopic viewed from the lateral direction Y. The insertion hole 34 penetrates the side plate 31 of the left side in the lateral direction Y. The side plate 31 on the left side is integrally provided in its right side face with a pair of locking portions 35 extending in the axial direction X so as to rim upper and lower end edges of the insertion hole 34 to project into the insertion hole 34.

The side plate 31 on the left side is integrally provided in its left side face with a pair of upper and lower receiving parts 36 projecting in the left 12 while rimming the insertion hole 34. A distance between the pair of receiving parts 36 in the vertical direction Z coincides with a width of the insertion hole 34 in the vertical direction Z. The receiving parts 36 are brought into contact with a side plate 28 on the left side from the right side. The steering device 1 further includes the movable tooth member 37, the stationary tooth member 47, and a lock and release mechanism 46.

Figure 3A:
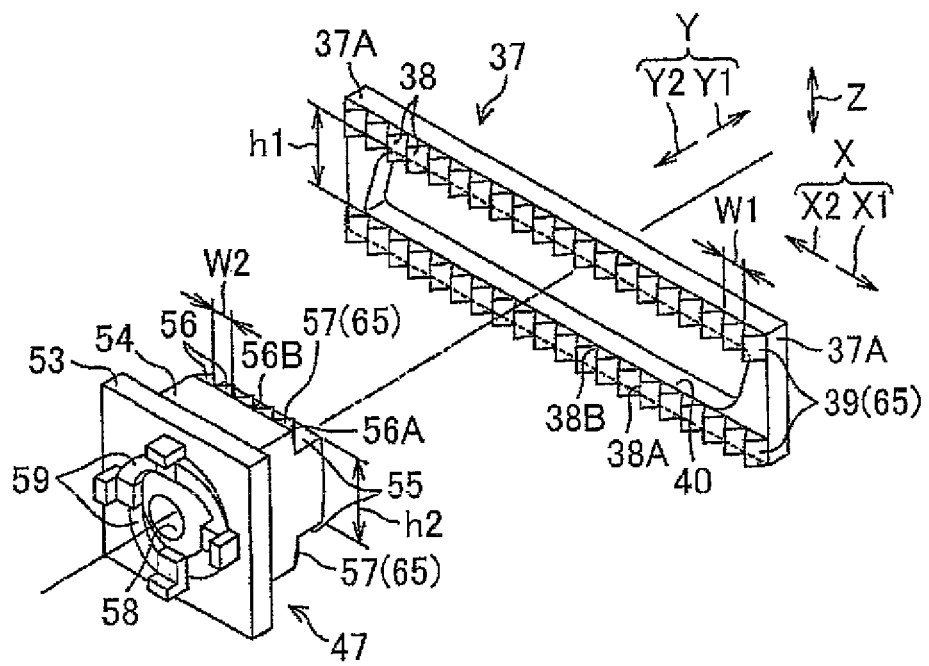
FIG. 3A is a perspective view of a movable tooth member 37 and a stationary tooth member 47.
Figure 3B:
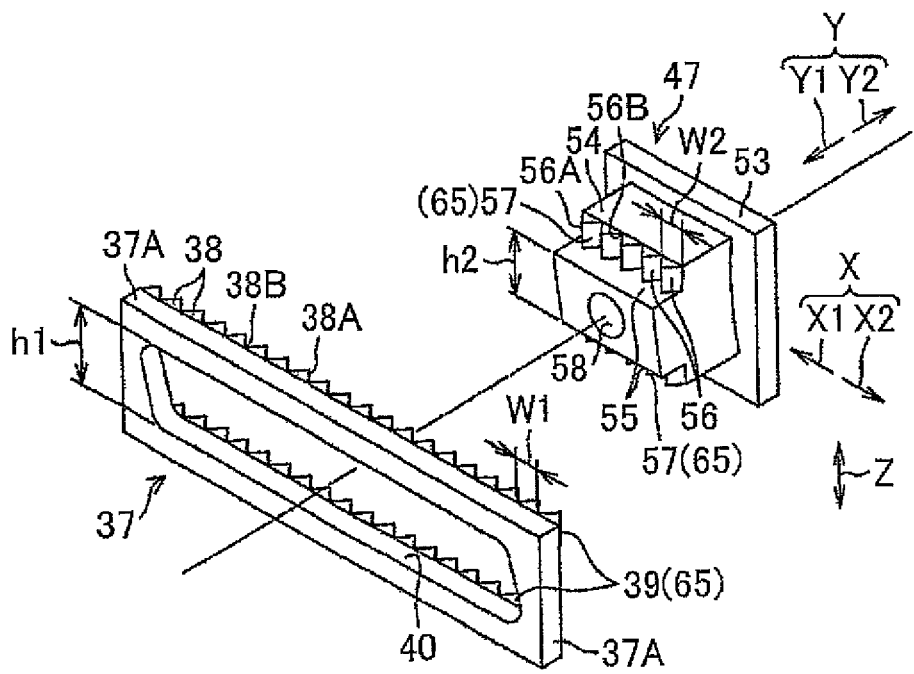
FIG. 3B is a perspective view of the movable tooth member 37 and the stationary tooth member 47 as viewed from a direction opposite to a direction of FIG. 3A.
Figure 4:
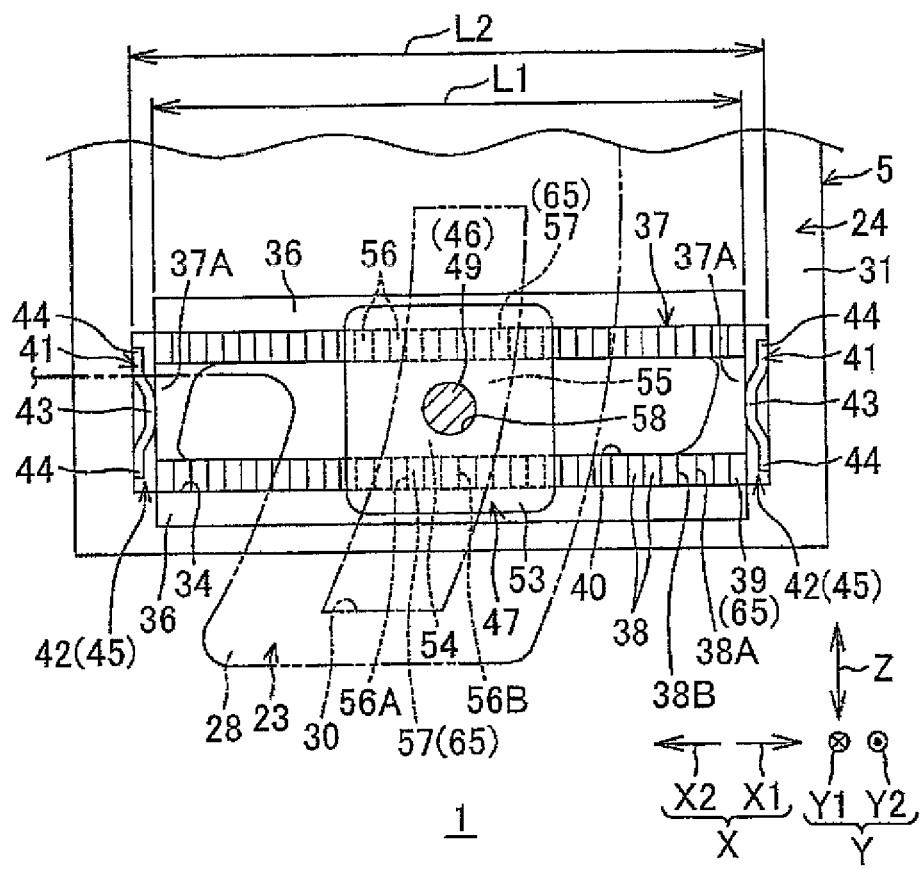
FIG. 4 is an enlarged view of a main section of an upper bracket 5 in FIG. 1.

FIG. 3A is a perspective view of the movable tooth member 37 and the stationary tooth member 47, and FIG. 3B is a perspective view of the movable tooth member 37 and the stationary tooth member 47 as viewed from a direction opposite to a direction of FIG. 3A. FIG. 4 is an enlarged view of a main section of the upper bracket 5 in FIG. 1. FIGS. 3A and 3B show as follows: the axial direction X is a direction connecting a right proximal side and a left back side in the paper-surface; the lateral direction Y is a direction connecting a left proximal side and a right back side in the paper surface; and the vertical direction Z is a direction extending vertically in the paper-surface. In FIG. 3A, the rear X1 extends in the right proximal side, and the front X2 extends in the left back side. In FIG. 3B, the rear X1 extends in the left back side, the front X2 extends in the right proximal side. In FIG. 3A, the right Y1 extends in the right back side, and the left Y2 extends in the left proximal side. In FIG. 3B, the right Y1 extends in the left proximal side, and the left Y2 extends in the right back side. FIG. 4 shows a posture of each member that coincides with a posture thereof in a case where FIG. 1 is inclined so that the axial direction X becomes horizontal.

With reference to FIG. 3A, the movable tooth member 37 like a plate is thin in the lateral direction Y, and is long in the axial direction X. The movable tooth member 37 has a pair of first teeth 39 composed of a plurality of teeth 38 aligned along the axial direction in a rack-shape. The pair of first teeth 39 is provide so as to be aligned at respective two ends in the vertical direction Z in an end face of the movable tooth member 37 on a side in the left Y2. The plurality of teeth 38 of each of the first teeth 39 is aligned at a uniform pitch W1. On the other hand, an end face of the movable tooth member 37 on a side in the right Y1 is flat in the axial direction X and the vertical direction Z over the entire area of the face.

In the movable tooth member 37, an elongated hole 40 that penetrates the movable tooth member 37 in the lateral direction Y and that is long in the axial direction X is formed in a space between the pair of first teeth 39, the space being a position deviated from the first teeth 39. The elongated hole 40 has both end edges in the axial direction X, the end edges inclining toward the rear X1 of the vehicle body 10 from a bottom. Thus, the elongated hole 40 is a substantially parallelogram when viewed from the lateral direction Y. The elongated hole 40 has a width hi in the vertical direction 4 the width being approximately identical with a distance between the pair of locking portions 35 is vertical direction Z (refer to FIG. 2).

With reference to FIG. 2, the movable tooth member 37 is fitted into the insertion hole 34 from the left side. The movable tooth member 37 is slightly smaller than the insertion hole 34 in the vertical direction Z, but is larger than the distance between the pair of locking portions 35. Thus, in a state where the movable tooth, member 37 is fitted into the insertion hole 34, an end face of the movable tooth member 37 on a side in the right Y1 is brought into contact with the locking portions 35 from the left side. As a result, the movable tooth member 37 stays in the insertion hole 34 without deviating in the lateral direction Y.

With reference to FIG. 4, the movable tooth member 37 has a width L1 in the axial direction X, the width being smaller than a width L2 of the insertion hole 34 in the axial direction. The movable tooth member 37 is fitted into the insertion hole 34 with play 45 in the axial direction X, corresponding to a difference between the widths L2 and L1. When viewed from the lateral direction Y, the elongated hole 40 overlaps with the elongated hole 33 for telescopic (refer to FIG. 2). In addition, each of the elongated hole 40 and the elongated hole 33 for telescopic intersects the elongated hole 30 for tilt when viewed from the lateral direction Y, and partially overlaps with the elongated hole 30 for tilt.

In the insertion hole 34, an elastic member 41 is provided one by one on each of both sides of the movable tooth member 37 in the axial direction X. The elastic member 41 is a leaf spring into which one metal plate that is long in the vertical direction Z is formed. Specifically, the elastic member 41 has a shape in which a central portion 43 in the vertical direction Z projects inwardly in the axial direction X of the insertion hole 34, the shape being formed by bending the metal plate. The elastic member 41 is arranged one by one in a gap 42 corresponding to a half of the play 45 described above, the gap being provided in each of both sides of the movable tooth member 37 in the axial direction X. The central portions 43 of the pair of elastic members 41 are in contact with both respective ends of the movable tooth member 37 in the axial direction X from either side in the axial direction X. Meanwhile, both ends 44 of each of the plastic members 41 in the vertical direction Z are brought into contact with the side plate 31 on a left side of the support bracket 24 in the end edges of the insertion hole 34 in the axial direction X and are fixed. Accordingly, each of the elastic members 41 is sandwiched between a portion defining the end of insertion hole 34 and the movable tooth member 37 in the support bracket 24. As a result, the elastic members 41 are compressed in the axial direction X. Thus, since the movable tooth member 37 receives pressing force equally from the elastic members 41 on both respective sides in the axial direction X, the movable tooth member 37 is elastically supported so as to be arranged at a predetermined neutral position in the axial direction X in the insertion hole 34. FIG. 4 shows the movable tooth member 37 that is placed at the neutral position, and then a size of each of the gaps 42 on both respective sides of the movable tooth member 37 is almost the same. The size of each of the gaps 42 is an extent to which each of the elastic members 41 is elastically deformable at a distance corresponds to at least a half of the pitch W1.

With reference to FIG. 2, the lock and release mechanism 46 mainly includes an operation lever 48, and an insertion shaft 49. The insertion shaft 49 has a substantially columnar shape extending in the lateral direction Y. The insertion shaft 49 is inserted into a portion where the elongated hole 40, the elongated hole 33 for telescopic, and the elongated hole 30 for tilt overlap with each other when viewed from the lateral direction Y. As a result, the insertion shaft 49 is inserted into the insertion hole 34 into which the movable tooth member 37 provided with the elongated hole 40 is fitted.

The insertion shaft 49 is provided with both ends in the lateral direction Y that protrude outside from a pair of side plates 28 of the fixing bracket 23. The insertion shaft 49 is provided with a left end in which a head portion 50 larger than the insertion shaft 49 in diameter is formed. Between the head portion 50 and the side plate 28 on the left side, there are aligned the operation lever 48, a cam 51, and the stationary tooth member 47, in this order from the left side. The insertion shaft 49 is inserted into each of the operation lever 48, the cam 51, and the stationary tooth member 47.

The insertion shaft 49 is provided with a right end to which a nut 60 is attached. Between the nut 60 and the side plate 28 on a right side, there are aligned an interposition member 61, a needle roller bearing 62, and a thrust washer 63, in this order from the left. The insertion shaft 49 is inserted into each of the interposition member 61, the needle roller bearing 62, and the thrust washer 63. The insertion shaft 49 is provided with a substantially central portion (between the pair of side plates 31 of the support bracket 24) in the lateral direction Y in which an eccentric cam 52 is provided so as to be rotatable together with the insertion shaft 49. The eccentric cam 52 is provided with a substantially central portion in the lateral direction Y, the central portion projecting in a radial direction of the insertion shaft 49.

With reference to FIG. 3, the stationary tooth member 47 integrally includes a pressing part 53, an engaging part 54, and a rotation regulation part 55. The pressing part 53 like a plate is thin in the lateral direction Y. The engaging part 54 is provided in the right Y1 from the pressing part 53 in the lateral direction Y. The engaging part 54 extends in the right Y1 from an end face of the pressing part 53 on a side in the right Y1. The engaging part 54 is smaller than the pressing part 53 in the axial direction X and the vertical direction Z. The engaging part 54 has a width in the vertical direction Z that is approximately identical With a width of the movable tooth member 37 in the vertical direction Z. The engaging part 54 is provided with both end faces in the axial direction X that curve along the elongated hole 30 for tilt (refer to FIG. 4). The engaging part 54 is provided with both two ends in the vertical direction Z in which either of a pair of second teeth 57 composed of a plurality of teeth 56 aligned along the axial direction in a rack-shape is formed. The plurality of teeth 56 of each of the second teeth 57 is aligned at a uniform pitch W2. The pitch W2 is equal to the pitch W1 of the teeth 38 of the first tooth 39 of the movable tooth member 37. In addition, the second tooth 57 has a tooth thickness that is equal to a tooth thickness of the first tooth 39.

The rotation regulation part 55 is provided in the right Y1 from the engaging part 54. The rotation regulation part 55 extends in the right Y1 from an end face of the engaging part 54 on a side in the right Y1. The rotation regulation part 55 is smaller than the engaging part 54 in the vertical direction 4 and is arranged between the pair of second teeth 57. The rotation regulation part 55 is provided with both end faces in the axial direction X that curve along the elongated hole 30 for tilt (refer to FIG. 4). Each of the end faces of the rotation regulation part 55 in the axial direction X is flush with each of end faces of the engaging part 54 in the axial direction X.

There is provided a circular insertion hole 58 at a substantially central portion in the axial direction X and the vertical direction Z of the pressing part 53 of the stationary tooth member 47. The insertion hole 58 penetrates the engaging part 54 and the rotation regulation part 55 to penetrate through the stationary tooth member 47 in the lateral direction Y. The insertion shaft 49 is inserted into the insertion hole 58 to be coupled to the stationary tooth member 47 (refer to FIG. 2).

With reference to FIG. 3, there is provided a cam protrusion 59 in an end face of the pressing part 53 of the stationary tooth member 47 on a side in the left Y2. The four cam protrusions 59 are provided at respective places in a circumferential direction centering the insertion hole 58 at equal intervals. Each of the cam protrusions 59 becomes higher gently in the left Y2 toward one side in the circumferential direction. With reference to FIG. 2, the pressing part 53 is arranged in the left Y2 of the side plate 28 on the left side. The engaging part 54 is inserted into the elongated hole 30 for tilt of the side plate 28 on the left side. In addition, the engaging part 54 is provided with a right end that protrudes from the elongated hole 30 for tilt to the right side so that the right end is arranged between the pair of upper and lower receiving parts 36 (the insertion hole 34) in the side plate 31 on the left side of the support bracket 24. Thus, the engaging part 54 (the stationary tooth member 47) is arranged to face the movable tooth member 37 in the insertion hole 34 in the lateral direction Y. In this state, the first tooth 39 on an upper side faces the second tooth 57 on an upper side, and the first tooth 39 on a lower side faces the second tooth 57 on a lower side.

The rotation regulation part 55 is inserted into the elongated hole 40 of the movable tooth member 37. The width h1 of the elongated hole 40 described above is almost equal to a width h2 of the rotation regulation part 55 in the vertical direction Z (strictly, the width h1 is slightly larger than the width h2)(refer to FIG. 3). The rotation regulation part 55 is provided with upper and lower end edges that extend along the axial direction X. Thus, rotation of the stationary tooth member 47 around the insertion shaft 49 is regulated by the rotation regulation part 55.

Since the rotation regulation part 55 is provided with the upper and lower end edges that extend along the axial direction X, movement of the stationary tooth member 47 in the axial direction X is not regulated. In addition, an end in the right Y1 of the rotation regulation part 55 reaches into a space between the pair of locking portions 35 in the lateral direction Y. The operation lever 48 and the cam 51 are rotatable together with the insertion shaft 49. Thus, when the operation lever 48 is rotated, the cam 51 is rotated so that a cam protrusion 64 provided on the cam 51 ascends the cam protrusion 59 provided in the stationary tooth member 47. Accordingly, the whole of the stationary tooth member 47 moves in the right Y1 along the axial direction of the insertion shaft 49 to come close to the movable tooth member 37, so that the pressing part 53 is pressed against the side plate 28 on the left side. Pressing here squeezes the pair of side plates 28 between the pressing part 53 and the interposition member 61. Accordingly, the side plate 28 on the left side is pressed against the side plate 31 on the left side and is in contact therewith. On the other hand, the side plate 31 on the right side is pressed by the side plate 28 on the right side pressed by the interposition member 61 and is in contact therewith. As above, a state of the operation lever 48, where a series of operations starting from rotation of the operation lever 48 allows the pair of side plates 28 (the fixing bracket 23) to be pressed against the pair of side plates 31 (the support bracket 24) and to be in contact therewith, is called a lever lock state. Accordingly, the side plate 28 on the left side is pressed against a receiving part 36 of the side plate 31 on the left side and is in contact therewith.

Figure 5:
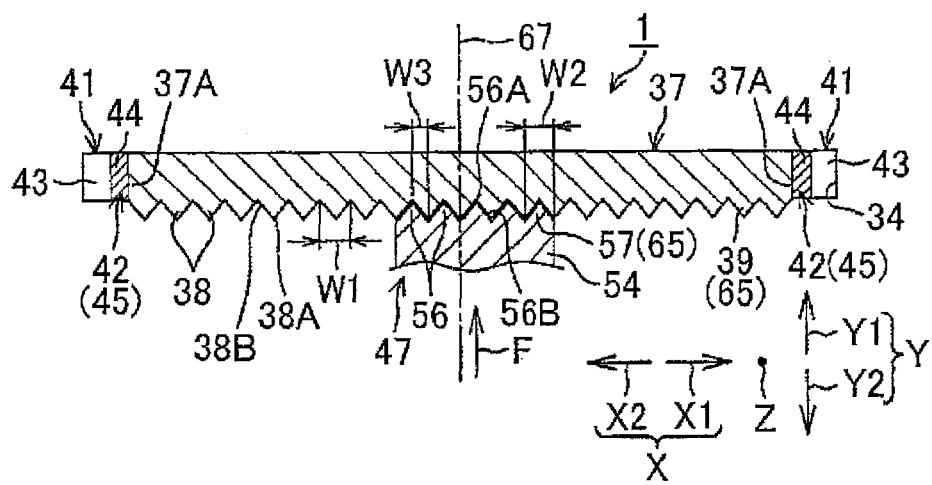
FIG. 5 shows the movable tooth member 37 and the stationary tooth member 47 in a state where a first tooth 39 and a second tooth 57 engage with each other.

In addition, the stationary tooth member 47 is moved in the right Y1 to allow the operation lever 48 to be in the lever lock state, so that the engaging part 54 is engaged with the movable tooth member 37 from the left side. Specifically, the operation will be described below. FIG. 5 shows the movable tooth member 37 and the stationary tooth member 47 in a state where the first tooth 39 and the second tooth 57 engage with each other. In FIG. 5, a direction orthogonal to a paper-surface corresponds to the vertical direction Z, a direction extending to right and left in the paper-surface corresponds to the axial direction X, and a direction extending up and down in the paper-surface corresponds to the lateral direction Y. Also in FIG. 5, the rear X1 extends to a right side in the paper-surface, the front X2 extends to a left side in the paper-surface, the right Y1 extends in an upper side in the paper-surface, and the left Y2 extends to a lower side in the paper-surface.

With reference to FIG. 5, as described above, the pitch W2 of the teeth 56 of the second tooth 57 in the engaging part 54 of the stationary tooth member 47 is equal to the pitch W1 of the teeth 38 of the first tooth 39 of the movable tooth member 37. Thus, when the engaging part 54 engages with the movable tooth member 37, the teeth 56 of the second tooth 57 on the upper side engage with the first tooth 39 on the upper side placed at the same position in the axial direction X, and the teeth 56 of the second tooth 57 on the lower side engage with the first tooth 39 on the lower side placed at the same position in the axial direction X. Specifically, a tooth tip 38A of the tooth 38 is fitted into a tooth groove 56B of the tooth 56 in a state where the tooth tip 38A is deviated from a tooth tip. 56A of the tooth 56 in the axial direction X by a width (hereinafter referred to as a "half pitch") W3 corresponding to a half of the pitch W1 or the pitch W2. On the other hand, the tooth tip 56A of the tooth 56 in this state is fitted into a groove 38B of the tooth 38. Accordingly, the first tooth 39 and the second tooth 57 just become an engaged state, so that relative movement between the fixing bracket 23 and the support bracket 24 is regulated. As a result, the upper column 15 on a side of the support bracket 24 cannot move in the axial direction X.

Pressing force from the stationary tooth member 47 when the first tooth 39 and the second tooth 57 engage with each other is designated by a reference character "F". The pressing force F corresponds to axial force of the insertion shaft 49. In a state where the engaging part 54 engages with the movable tooth member 37, the receiving part 36 of the support bracket 24, instead of an engaged portion 65 between the first tooth 39 and the second tooth 57, receives the pressing force F of the pressing part 53 (refer to FIG. 2). Thus, the tooth tip 56A of the second tooth 57 and the tooth tip 38A of the first tooth 39 slightly float above a bottom of the tooth groove 38B of the movable tooth member 37 and a bottom of the tooth groove 56B of the stationary tooth member 47, respectively. That is, in the lever lock state, the engaged portion 65 between the fast tooth 39 and the second tooth 57 is not received the pressing force F. As a result, it is possible to prevent breakage of the first tooth 39 and the second tooth 57 in the engaged portion 65.

As above, in the lever lock, the first tooth 39 and the second tooth 57 engage with each other to lock telescoping. In addition, the pair of side plates 28 of the fixing bracket 23 is pressed against the pair of side plate 31 of the support bracket 24 and is in contact therewith to lock tilting. At this time, as shown in FIG. 2, the eccentric cam 52 enters a through-hole 15A provided in an outer peripheral surface on a lower side of the upper column 15 to press the lower column 16 on the upper column 15.

From the lever lock state as above, the operation lever 48 is rotated in a direction opposite to the above. Then, the cam 51 rotates with respect to the stationary tooth member 47 with rotation of the operation lever 48. Accordingly, the cam protrusion 64 of the cam 51 does not ascend the cam protrusion 59 of the stationary tooth member 47, so that the stationary tooth member 47 moves in the left Y2 along the axial direction of the insertion shaft 49. As a result, a squeeze of the pair of side plates 31 in a space between the pressing part 53 of the stationary tooth member 47 and the interposition member 61 is released. Thus, each of the side plates 31 is released from being pressed by each of the pair of corresponding side plates 28 and being in contact therewith. In addition, the eccentric cam 52 is retracted from the through-hole 15A to release the lower column 16 from being pressed on the upper column 15. As above, a state of the operation lever 48, where a series of operations starting from rotation of the operation lever 48 allows the pair of side plates 31 to be released from being pressed by the pair of side plates 28 and being in contact therewith, is called a lever unlock state.

In the lever unlock state, the stationary tooth member 47 is separate from the movable tooth member 37 in the left Y2, so that the second tooth 57 is also separate from the first tooth 39 in the left Y2. That is, engagement between the second tooth 57 and the first tooth 39 is released. In this state, relative movement of the upper column 15 with respect to the lower column 16 in the axial direction X becomes possible, so that the relative movement enables a telescopic adjustment of the steering member 2. During the telescopic adjustment, the support bracket 24 moves in the axial direction X together with the upper column 15. At this time, the movable tooth member 37 on a side of the support bracket 24 moves relatively to the stationary tooth member 47 in the axial direction X, so that a portion of the first tooth 39, facing the second tooth 57, is deviated. In addition, at this time, the insertion shaft 49 moves relatively to the support bracket 24 and the upper column 15 in the axial direction X. The amount of relative movement with respect to the upper column 15 in the axial direction X of the insertion shaft 49 is the amount of the telescopic adjustment of the steering member 2.

In addition, in a state where locking of the upper column 15 is released by the lock and release mechanism 46, a tilt adjustment of the steering member 2 is also possible. During the tilt adjustment, the insertion shaft 49 can be moved relatively to the fixing bracket 23 in the elongated hole 30 for tilt. As described above, the lock and release mechanism 46 allows the stationary tooth member 47 to move in the lateral direction Y so that the stationary tooth member 47 is brought into contact with the movable tooth member 37 and is separated therefrom. As a result, it is possible to allow the second tooth 57 to engage with the first tooth 39 to lock the upper column 15 in the axial direction X, and to release engagement between the first tooth 39 and the second tooth 57 to unlock the upper column 15.

As described above, rotation of the stationary tooth member 47 around the insertion shaft 49 is regulated by the rotation regulation part 55. Accordingly, the stationary tooth member 47 can move in the lateral direction Y without rotating together with the insertion shaft 49. As a result, the stationary tooth member 47 allows the second tooth 57 to reliably engage with the first tooth 39 and reliably release engagement between the first tooth 39 and the second tooth 57.

Figure 6:
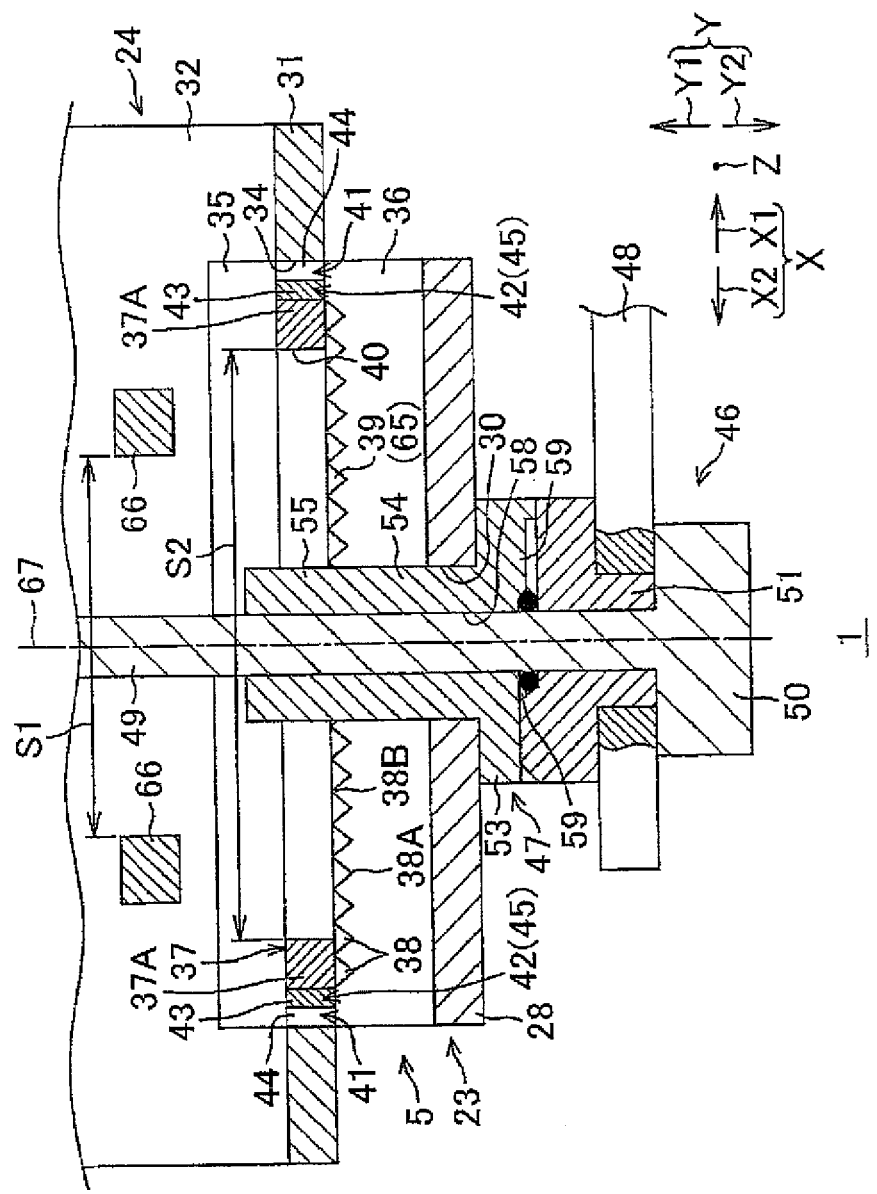
FIG. 6 shows a cross section take along the line VI-VI of FIG. 2 as viewed from above.

FIG. 6 shows a cross section taken along line VI-VI of FIG. 2 as viewed from above. FIG. 6 shows a posture of each member that coincides with that in FIG. 5 (the same applies to FIGS. 7 and 8). With reference to FIG. 6, in a top face the coupling plate 32 of the support bracket 24, a pair of telescopic regulation parts 66 extending in the vertical direction Z is provided at a position in the right Y1 from the locking portion 35 of the movable tooth member 37. The position is separate from each of the elongated hole 40 and the insertion hole 34. The pair of telescopic regulation part 66 like a protrusion extends upward from the top face of the coupling plate 32, and is arranged in the axial direction X at an interval across the insertion shaft 49. Specifically, the pair of telescopic regulation parts 66 is arranged at symmetric positions in the axial direction X across a plane 67 that passes through a central portion of the insertion hole 34 in the axial direction X and that is perpendicular to the axial direction X. A distance S1 in the axial direction X between the pair of telescopic regulation parts 66 is equal to a dimension in the axial direction X of the elongated hole 33 for telescopic (refer to FIG. 2) of the side plate 31 on the right side, and is shorter than a distance S2 in the axial direction X between both ends of the elongated hole 40. Thus, during the telescopic adjustment, the insertion shaft 49 can move in the axial direction X with respect to the upper column 15 within the distance S1 that is set at a predetermined range (the amount of the telescopic adjustment described above). That is, the telescopic regulation part 66 regulates the amount of relative movement of the insertion shaft 49 in the axial direction X in the telescopic adjustment within the predetermined range.

Since the telescopic regulation part 66 is not displaced in the axial direction unlike the elongated hole 40 that is displaced together with the movable tooth member 37 inserted into the insertion hole 34, it is possible to reliably regulate the amount of the telescopic adjustment within the distance S1. The first tooth 39 is provided over a range wider than the distance S1 in the movable tooth member 37. As a result, it is possible to prevent a failure in which the second tooth 57 comes off from the first tooth 39 in the axial direction X after the telescopic adjustment within the distance S1, so that the second tooth 57 cannot engage with the first tooth 39.

Figure 7:
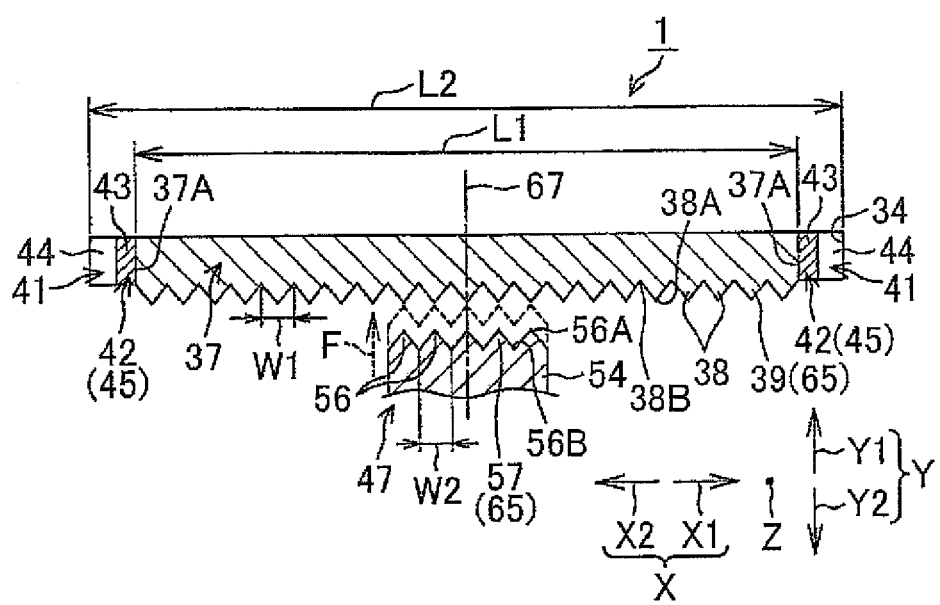
FIG. 7 is a schematic diagram showing the movable tooth member 37 and the stationary tooth member 47 when a telescopic adjustment is performed so that tooth tips 38A of the first tooth 39 and tooth tips 56A of the second tooth 57 are positioned at the same position in an axial direction X.
Figure 8:
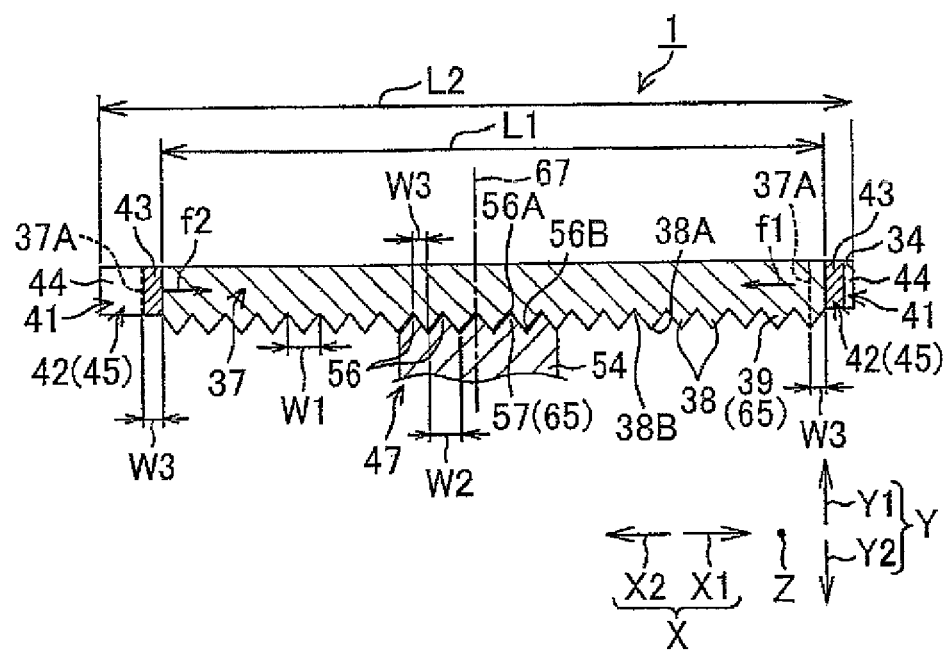
FIG. 8 shows a state where the first tooth 39 and the second tooth 57 engage with each other in FIG. 7.

FIG. 7 is a schematic diagram showing the movable tooth member 37 and the stationary tooth-member 47 when a telescopic adjustment is performed so that tooth tips 38A of the first tooth 39 and tooth tips 56A of the second tooth 57 are positioned at the same position in an axial direction X. FIG. 8 shows a state where the first tooth 39 and the second tooth 57 engage with each other in FIG. 7. When the stationary tooth member 47 is moved to come close to the movable tooth member 37 in order to lock the upper column 15 after the telescopic adjustment, as shown in FIG. 7, there is a possibility that the tooth tip 38A of the first tooth 39 and the tooth tip 56A of the second tooth 57 may be arranged at the same position in the axial direction X. If it is tried to change a state to the lever lock state, as it is, a half-lock state; where the tooth tip 38A and the tooth tip 56A are pressed on each other and are in contact with each other, occurs. As a result, the operation lever 48 becomes hard to operate in the middle of operation, so that it is impossible to operate the operation lever 48 to the lever lock state.

As described above, the movable tooth member 37 is fitted into the insertion hole 34 with play 45. Thus, if the tooth tip 38A of the first tooth 39 and the tooth tip 56A of the second tooth 57 are brought into contact with each other in this state, as shown in FIG. 8, the movable tooth member 37 is displaced in the axial direction X to deviate the tooth tip 38A of the first tooth 39 from the tooth tip 56A of the second tooth 57. The movable tooth member 37 is elastically supported by the elastic members 41 from both sides in the axial direction X. Thus, if the tooth tip 38A and the tooth tip 56A are brought into contact with each other, the movable tooth member 37 is elastically displaced to either of the sides in axial direction X from the neutral position described above (refer to FIG. 8) in order to relieve the pressing force F to be received by the first tooth 39 and the second tooth 57 caused by the contact above. At this time, the movable tooth member 37 is displaced in an acting direction of a component in the axial direction X of force that is applied to the tooth tip 38A.

With reference to FIG. 8, in the present embodiment, the component of the force applied to the tooth tip 38A acts on a side in the rear X1 in the axial direction X, so that the movable tooth member 37 is displaced in the rear X1. Here, in a state where the movable tooth member 37 is placed at the neutral, both ends 37A of the movable tooth member 37 in the axial direction X are shown with broken lines. In a state where the first tooth 39 and the second tooth 57 engage with each other, the both ends 37A are deviated from the neutral position in the axial direction X (the rear X1) by the half pitch W3 described above.

If the movable tooth member 37 is displaced in the rear X1, the gap 42 on a side in the rear X1 becomes narrower than a half of a difference between the width L2 of the insertion hole 34 in the axial direction X and the width L1 of the movable tooth member 37 in the axial direction X by the half pitch W1. Thus, the elastic member 41 on the side in the rear X1 is more compressed than that in a state where the movable tooth member 37 is placed at the neutral position. On the other hand, the gap 42 on a side in the front X2 becomes wider that the half of the difference between the width L2 and the width L1 by the half pitch W3. Thus, the elastic member 41 on the side in the front X2 is less compressed than that in a state where the movable tooth member 37 is placed at the neutral position. As a result, a pressing force f1 with which the elastic member 41 presses on the movable tooth member 37 on the side in the rear X1 becomes larger than a pressing force f2 with which the elastic member 41 on the side in the front X2 presses on the movable tooth member 37 (f1>f2). Accordingly, the pair of elastic members 41 is tried to be elastically displaced so that the pressing force f1 and the pressing force f2 return to uniform. That is, in this state, the'pair of elastic members 41 supports the movable tooth member 37 so that the movable tooth member 37 returns to the neutral position.

As above, the elastic members 41 provided on the both sides of the movable tooth member 37 in the axial direction X in the insertion hole 34 can elastically displace the movable tooth member 37 in the axial direction, and return the movable tooth member to the predetermined neutral position when engagement between the first tooth 39 and the second tooth 57 is released. It is obvious that in a case where the component of the force applied to the tooth tip 38A acts on the side in the front X2 in the axial direction X, the movable tooth member 37 is displaced in the front X2. In this case, the elastic member 41 on the side in the front X2 becomes a more compressed state than a state where the elastic member 41 on the side in the rear X1 is compressed. In this state, the pressing force f1 with which the elastic member 41 presses on the movable tooth member 37 on the side in the rear X1 becomes smaller than the pressing force f2 with which the elastic member 41 on the side in the front X2 presses on the movable tooth member 37 (f1<f2). As above, the movable tooth member 37 is elastically displaceable to both the ends in the axial direction from the predetermined neutral position.

As described above, the first tooth 39 and the second tooth 57 can engage with each other without half-lock. Thus, for example, it is not required to separately provide a component that is brought into contact with the tooth tip 56A of the second tooth 57 before the tooth tip 38A of the first tooth 39 is brought into contact with the tooth tip 56A of the second tooth 57 to guide the first tooth 39 to prevent the half-lock from occurring. As a result, it is possible to prevent the half-lock with a simple structure. In addition, the movable tooth member 37 can be displaced in the axial direction X, so that it is possible to perform a telescopic adjustment in a stepwise manner per distance (the pitch W1) between tooth tips 38A adjacent to each other in the first tooth 39 as well as a subtle telescopic adjustment in a range of the pitch W1 by subtly deviating engagement between the first tooth 39 and the second tooth 57. That is, it is possible to steplessly perform the telescopic adjustment.

As compared with a case where the component for guiding the first tooth 39 to the second tooth 57, for example, is separately provided, the steering device 1 of the present embodiment is capable of improving a function by addition or variation of a few number of components. As a result, it is possible to reduce cost and it is also possible to apply the steering device to various vehicle types because layout availability (easiness of arrangement in relation to another component in a vehicle) is not impaired.

There is assumed a comparative example, unlike the present embodiment, in which a mating tooth member (corresponding to the movable tooth member 37 of the present embodiment) that is brought into contact with the stationary tooth member 47 and is separated therefrom cannot be displaced in the axial direction X. In the case of the comparative example, if the first tooth 39 and the second tooth 57 come close to each other in a state where the tooth tip 38A of the first tooth 39 and the tooth tip 56A of the second tooth 57 are arranged at the same position in the axial direction X, the first tooth 39 and the second tooth 57 engage with each other in a half-lock state. Thus, the operation lever 48 can be allowed to be the lever lock state only in a state where a telescopic adjustment is performed so that the second tooth 57 and the first tooth 39 just engage with each other. As a result, in the steering device 1 of the comparative example, the telescopic adjustment can be performed only in a stepwise (with steps) manner per a distance (pitch W1) between tooth tips 38A adjacent to each other in the first tooth 39.

In addition, in the steering device 1 of the present embodiment, the first tooth 39 and the second tooth 57 always engage with each other in the lever lock state, so that engagement between the first tooth 39 and the second tooth 57 is not suddenly disengaged due to a so-called secondary collision at the time of a vehicle collision. Further, in the present embodiment, since the receiving part 36 is provided separately from the movable tooth member 37, the movable tooth member 37 can be smoothly displaced in the axial direction X to prevent the half-lock without being affected by the pressing force F applied from the stationary tooth member 47.

Figure 9:
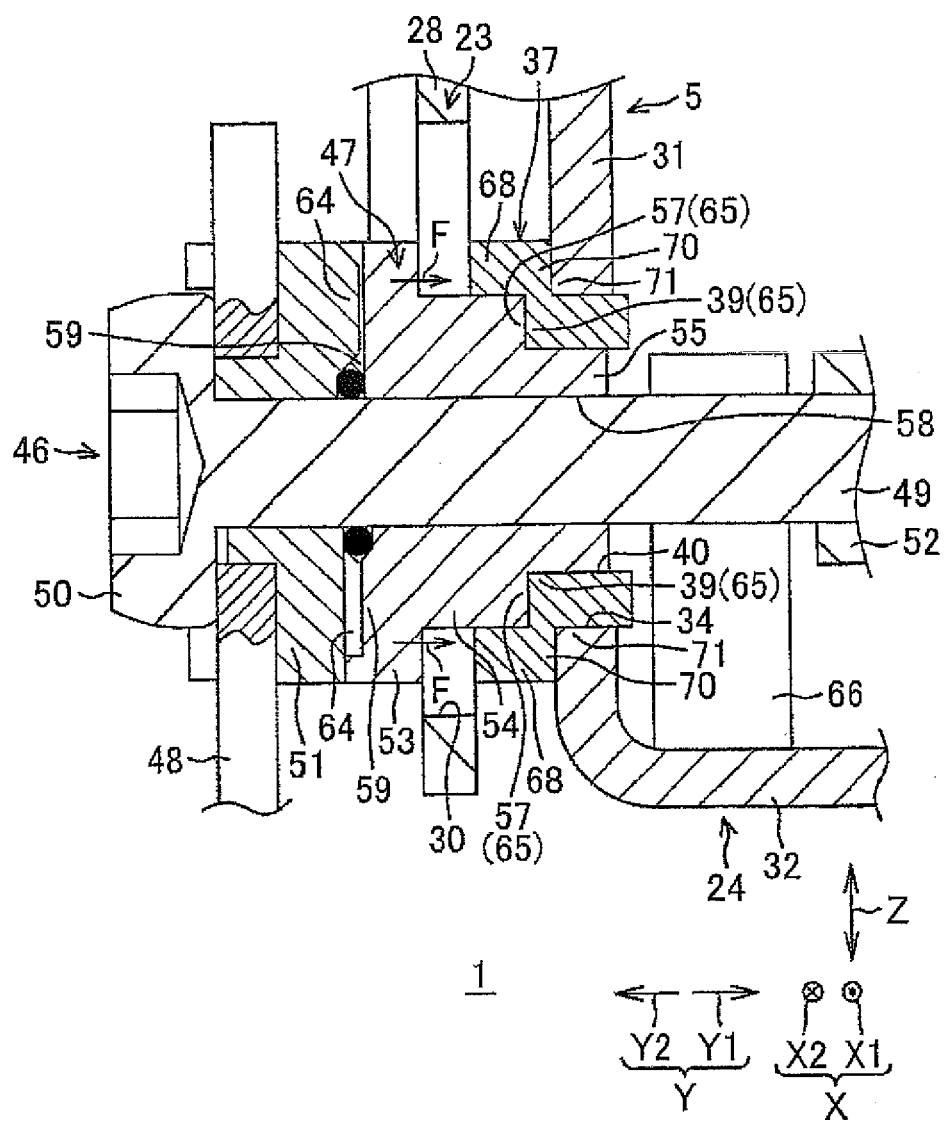
FIG. 9 is a sectional view of a portion where the movable tooth member 37 and the stationary tooth member 47 engage with each other and a periphery of the portion of a first variation of the present invention.

Next, a first variation of the present invention will be described. FIG. 9 is a sectional view of a portion where the movable tooth member 37 and the stationary tooth member 47 engage with each other and a periphery of the portion of the first variation of the present invention. FIG. 9 shows a posture of each member that coincides with that in FIG. 2. In FIG. 9, a member equivalent to the member described above is designated by the same reference character, and a description of the member is omitted.

With reference to FIG. 9, the side plate 31 on the left side of the first variation is not provided with the pair of receiving parts 36 and the pair of locking portions 35. The movable tooth member 37 of the first variation integrally includes a pair of receiving pars 68 corresponding to the receiving part 36. The receiving part 68 is provided on an outer side of the first tooth 39 in the vertical direction Z. The receiving part 68 extends in the left Y2 from the first tooth 39, and is brought into contact with the side plate 28 on the left side from the right side. In the movable tooth member 37, a portion on a side in the right Y1 from the receiving part 68 is reduced stepwise in the vertical direction Z, so that a step 70 is provided on a side in the right Y1 from the receiving part 68. Thus, in a state where the movable tooth member 37 is fitted into the insertion hole 34, the step 70 of the movable tooth member 37 is brought into contact with a peripheral portion 71 of the insertion hole 34 in the side plate 31 on the left side from the left side, so that the movable tooth member 37 stays in the insertion hole 34.

Figure 10:
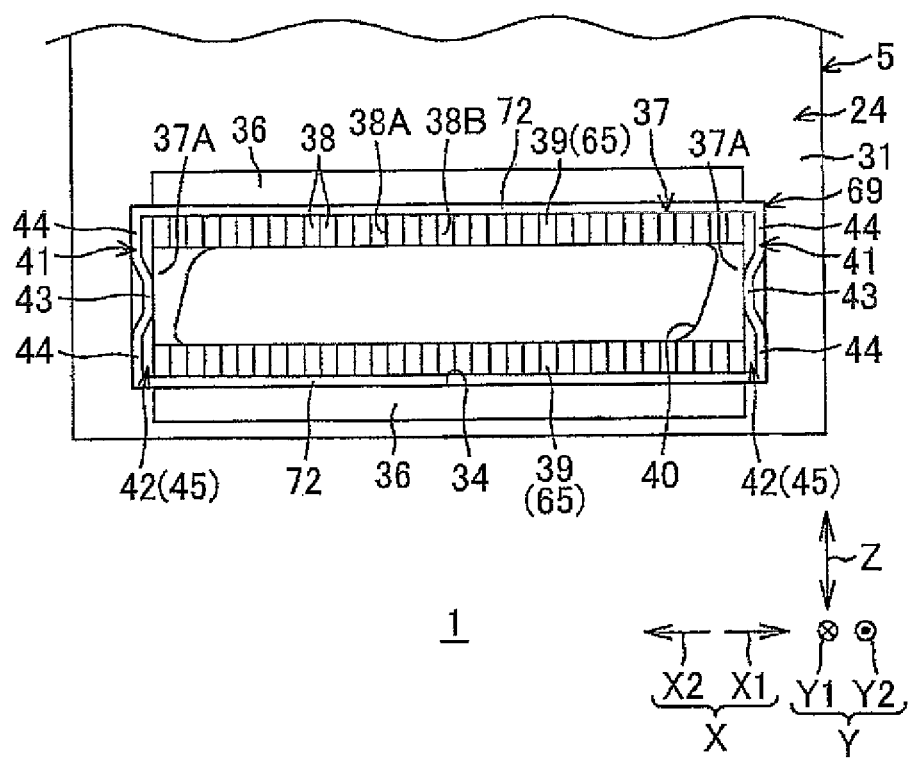
FIG. 10 is a schematic diagram showing an elastic member 69 and a periphery of the elastic member of a second variation of the present invention.

In a case where the movable tooth member 37 of the first variation is used, a structure of the support bracket 24 can be simplified, so that it is possible to reduce cost. Next, a second variation will be described. FIG. 10 is a schematic diagram showing an elastic member 69 and a periphery of the elastic member of the second variation of the present invention. FIG. 10 shows a posture of each member that coincides with that in FIG. 4. With reference to FIG. 10, the elastic member 69 of the second variation is formed by connecting both ends 44 of each of the pair of elastic members 41 of the present embodiment in the vertical direction Z to a respective pair of plate-shaped portions 72. The elastic member 69 is arranged in the insertion hole 34 so as to rim an inner peripheral face of the insertion hole 34. The movable tooth member 37 is arranged inward from the elastic member 69 in the axial direction X and the vertical direction Z. In this case, the elastic member 69 is provided at both ends in the axial direction X and at both ends in the vertical direction Z in the insertion hole 34.

The present invention is not limited to the embodiments described above. For example, the elastic member 41 may be a disk spring, a coil spring, or the like. In addition, in order to reliably release engagement between the first tooth 39 and the second tooth 57 when the operation lever 48 is rotated from a state where the first tooth 39 and the second tooth 57 engage with each other, a releasing spring may be provided between the stationary tooth member 47 and the movable. tooth member 37. The releasing spring urges the stationary tooth member 47 and the movable tooth member 37 so that one of them separates from the other of them.

The elastic member 41 may be provided at least at both ends of the movable tooth member 37 in the axial direction X in the insertion hole 34. The receiving part 36 may not be integrally provided with respect to the side plate 31 on the left side or the movable tooth member 37. For example, the receiving part 36 may be formed into a columnar shape extending in the axial direction X, and may be fixed to the support bracket 24 by a technique in which the receiving part is fitted into a groove or the like provided in a side face of the side plate 31 on the left side, or the like, or may be fitted into the insertion hole 34 to be supported by the support bracket 24.

In addition, the telescopic regulation part 66 may be provided in the side plate 31 or the upper column 15. That is, the telescopic regulation part 66 may be provided at a portion where the telescopic regulation part 66 is moved relatively to the insertion shaft 49 in the axial direction X together with the upper column 15 at the time of the telescopic adjustment. Further, the movable tooth member 37 may be provided in both of the pair of side plates 31. In this case, the stationary tooth member 47 is interposed between the side plate 28 on a side in the left Y2 and the cam 51, and between the side plate 28 on a side in the right Y1 and the nut 60 so that the second tooth 57 of the stationary tooth member 47 and the first tooth 39 of the movable tooth member 37 can engage with each other in the lever lock state.

What is claimed is:
1. A steering device by comprising:
  a steering shaft having one end connected to a steering member, the steering shaft being extendable in an axial direction;
  a steering column that has an upper column provided on a side of the steering member and a lower column provided on a side opposite to the side of the steering member, the steering column rotatably supporting the steering shaft with the upper column and the lower column and allowing for telescopic adjustment of the steering member by relative displacement of the upper column in the axial direction with respect to the lower column;
  a support bracket that is provided with an insertion hole elongated in the axial direction, the insertion hole extending in an orthogonal direction that is a lateral direction orthogonal to the axial direction, and the support bracket being fixed to the upper column;
  a movable tooth member that has a first tooth composed of a plurality of teeth aligned along the axial direction in a rack-shape, and that is inserted into the insertion hole with play in the axial direction to be elastically displaceable to both sides in the axial direction from a predetermined neutral position;

a stationary tooth member that has a second tooth provided with teeth engageable with the first tooth, and that is arranged so as to face the movable tooth member in the orthogonal direction; and a lock and release mechanism that moves the stationary tooth member in the orthogonal direction to allow the stationary tooth member to be brought into contact with the movable tooth member or to be separated from the movable tooth member, thereby allowing the second tooth to engage with the first tooth to lock the upper column in the axial direction, or releasing engagement between the first tooth and the second tooth to release lock of the upper column.

2. The steering device according to claim 1, wherein elastic members are provided at least on both sides of the movable tooth member in the axial direction in the insertion hole to elastically support the movable tooth member such that the movable tooth member is returned to the neutral position.

3. The steering device according to claim 1, wherein the movable tooth member includes an elongated hole that is provided at a position deviated from the first tooth to penetrate the movable tooth member in the orthogonal direction, and that is elongated in the axial direction, and the lock and release mechanism includes an insertion shaft that extends in the orthogonal direction to be inserted into the elongated hole and the insertion hole, and that is connected to the stationary tooth member to be able to be relatively moved in the axial direction with respect to the upper column, and wherein the support bracket includes a telescopic regulation part that is provided at a position separate from each of the elongated hole and the insertion hole, and that regulates an amount of relative movement of the insertion shaft in the axial direction in the telescopic adjustment within a predetermined range.

4. The steering device according to claim 3, wherein the stationary tooth member includes a rotation regulation part that regulates rotation of the stationary tooth member around the insertion shaft.

5. The steering device according to claim 1, further comprising a receiving part that receives pressing force instead of an engaged portion between the first tooth and the second tooth, the pressing force being applied from the stationary tooth member when the first tooth and the second tooth engage with each other.

6. The steering device according to claim 5, wherein the receiving part is provided separately from the movable tooth member.

* * * * *